(12) United States Patent
Kohlmeier et al.

(10) Patent No.: US 7,653,528 B2
(45) Date of Patent: Jan. 26, 2010

(54) RESOURCE AUTHORING INCORPORATING ONTOLOGY

(75) Inventors: Bernhard Kohlmeier, Woodinville, WA (US); Lori A. Brownell, Fall City, WA (US); Wei Wu, Redmond, WA (US); Shenghua (Ed) Ye, Sammamish, WA (US); Jordi Mola Marti, Redmond, WA (US); Jan Anders Nelson, Gig Harbor, WA (US); Mohammed El-Gammal, Woodinville, WA (US); Julie D. Bennett, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 11/118,544

(22) Filed: Apr. 29, 2005

(65) Prior Publication Data

US 2006/0206303 A1    Sep. 14, 2006

Related U.S. Application Data

(60) Provisional application No. 60/659,616, filed on Mar. 8, 2005.

(51) Int. Cl.
*G06F 17/20* (2006.01)
(52) U.S. Cl. .................. 704/8; 704/2; 704/4; 704/9; 717/137
(58) Field of Classification Search ............... 704/1–9; 717/137
See application file for complete search history.

(56) References Cited

U.S. PATENT DOCUMENTS

| | | | | |
|---|---|---|---|---|
| 5,664,206 A | * | 9/1997 | Murow et al. ............. | 704/8 |
| 5,678,039 A | * | 10/1997 | Hinks et al. ............... | 707/4 |
| 5,694,559 A | | 12/1997 | Hobson et al. | |
| 5,918,222 A | | 6/1999 | Fukui et al. ............... | 707/1 |

(Continued)

FOREIGN PATENT DOCUMENTS

EP      1 315 084 A1     5/2003

(Continued)

OTHER PUBLICATIONS

Knight et al, "Building a large-scale knowledge base for machine translation" Proceedings of the twelfth national conference on Artificial intelligence, 1994, Seattle, Washington, United States, vol. 1. pp. 773-778.*

(Continued)

*Primary Examiner*—Richemond Dorvil
*Assistant Examiner*—Jialong He
(74) *Attorney, Agent, or Firm*—Westman, Champlin & Kelly, P.A.

(57) ABSTRACT

The present specification provides a system and method for localizing data. In one embodiment, a localization platform is provided and is operably coupled to an operating system. The localization platform includes a plurality of localization components providing localized data that is localized to one or more distinct markets. The localization platform also includes an ontology store storing ontology information and a translation matching component configured to receive a localization request corresponding to input data to be localized. The translation matching component is configured to access the plurality of localization components and the ontology store based on the localization request. The translation matching component selects and outputs localized data from one or more of the plurality of localization components based on predetermined criteria.

14 Claims, 6 Drawing Sheets

U.S. PATENT DOCUMENTS

| | | | | |
|---|---|---|---|---|
| 6,092,036 | A * | 7/2000 | Hamann | 704/8 |
| 6,092,037 | A * | 7/2000 | Stone et al. | 704/8 |
| 6,151,022 | A | 11/2000 | Alshibani et al. | 715/788 |
| 6,169,981 | B1 | 1/2001 | Werbos | |
| 6,275,790 | B1 * | 8/2001 | Yamamoto et al. | 704/8 |
| 6,275,978 | B1 | 8/2001 | Bell | 717/143 |
| 6,321,190 | B1 * | 11/2001 | Bernardes et al. | 704/8 |
| 6,425,123 | B1 | 7/2002 | Rojas et al. | 717/136 |
| 6,490,547 | B1 | 12/2002 | Atkin et al. | 704/8 |
| 6,519,571 | B1 | 2/2003 | Guheen et al. | |
| 6,530,039 | B1 | 3/2003 | Yang | 714/38 |
| 6,865,716 | B1 | 3/2005 | Thurston, Robert | 715/207 |
| 6,938,259 | B2 | 8/2005 | McGeorge, Jr. | 719/313 |
| 6,993,568 | B1 | 1/2006 | Hauduc et al. | 709/217 |
| 7,110,937 | B1 * | 9/2006 | Lei et al. | 704/2 |
| 7,318,020 | B1 * | 1/2008 | Kim | 704/2 |
| 7,437,704 | B2 * | 10/2008 | Dahne-Steuber et al. | 717/100 |
| 2002/0052910 | A1 | 5/2002 | Bennett et al. | 709/104 |
| 2002/0107684 | A1 | 8/2002 | Gao | |
| 2002/0111787 | A1 | 8/2002 | Knyphausen et al. | |
| 2002/0116172 | A1 | 8/2002 | Vargas | 704/8 |
| 2002/0143523 | A1 | 10/2002 | Balaji et al. | 704/8 |
| 2003/0135358 | A1 | 7/2003 | Lissauer et al. | 704/2 |
| 2003/0154071 | A1 * | 8/2003 | Shreve | 704/9 |
| 2003/0191626 | A1 * | 10/2003 | Al-Onaizan et al. | 704/8 |
| 2004/0024603 | A1 | 2/2004 | Mahoney et al. | 704/277 |
| 2004/0102956 | A1 * | 5/2004 | Levin | 704/2 |
| 2004/0122652 | A1 * | 6/2004 | Andrews et al. | 704/2 |
| 2004/0255281 | A1 | 12/2004 | Imamura et al. | |
| 2005/0033718 | A1 | 2/2005 | Rettig et al. | 707/1 |
| 2005/0055217 | A1 | 3/2005 | Sumita et al. | |
| 2005/0075858 | A1 | 4/2005 | Pournasseh et al. | 704/2 |
| 2005/0097109 | A1 | 5/2005 | Bitsch | |
| 2005/0288920 | A1 * | 12/2005 | Green et al. | 704/3 |
| 2006/0173671 | A1 | 8/2006 | Okawa | 704/5 |

FOREIGN PATENT DOCUMENTS

| | | |
|---|---|---|
| EP | 1135084 | 5/2003 |

OTHER PUBLICATIONS

Mahesh et al. "If you have it, flaunt it: Using full ontological knowledge for word sense disambiguation", Proceedings of Theoretical and Methodological Issues in Machine Translation (TMI-97). 1997, Santa Fe, NM.*

PCT/US06/12901 PCT International Search Report Mar. 8, 2006.

Kevin Knight et al., "Building a Large-Scale Knowledge Base for Machine Translation", In: Am. Assoc. Artificial Intelligence 1994, Introduction, 6 pages.

European Search Report from Application No. 06110643.1-2211, filed Jun. 21, 2006.

Frederking, R. et al. "Integrating translations from multiple sources within the Pangloss Mark III machine translation system." Proceedings of the First AMTA Conference, [Online] Oct. 1984 pp. 1-8.

European Search Report from Application No. 06110662.01, filed Jun. 21, 2006.

Gaspari, F: "Enhancing free on-line machine translation services", Proceedings of the 7th Annual CLUK Research Colloquim. Jan. 6, 2004.

U.S. Appl. No. 11/040,330, Entitled "Load Time Bullet Proofing for Application Localization" (Currently non-published).

U.S. Appl. No. 11/042,470, Entitled "Safe, Secure Resource Editing for Application Localization with Automatic Adjustment of Application User Interface for Translated Resources" (Currently non-published).

U.S. Appl. No. 11/040,331, Entitled "Safe, Secure Resource Editing for Application Localization with Language Fallback" (Currently non-published).

U.S. Appl. No. 11/042,806, Entitled "Method and System for Automatically Identifying and Marking Subsets of Localizable Resources" (Currently non-published).

U.S. Appl. No. 11/002,773, Entitled "Safe, Secure Resource Editing for Application Localization", by Barry McHugh et al., (Currently non-published).

First Office Action from Chinese patent application No. 20060059641.X, dated Sep. 19, 2008.

Chinese Application No. 200610059634X, First Office Action, dated Apr. 17, 2009.

Frederking et al., Integrating Translations From Multiple Sources Within The Pangloss Mark III Translation System, dated Oct. 31, 1994.

Chinese Application No. 200610059634.X Notice on Submission of Materials, Dated Feb. 13, 2009.

First Office Action from Chinese Application No. 200610059640.05 dated Feb. 6, 2009.

Shimohata, S. et al., "Collaborative Translation Environment on the Web", Online Article, [online] Jun. 4, 2003, pp. 1-4, URL:http://web.archive.org/web/20030604215.

Whyman E K et al., "Evaluation Metrics for a Translation Memory System" Software Practice & Experience, Wiley & Sons, Bognor Regis, GB, vol. 29 No. 14, Dec. 10, 1999, pp. 1265-1284.

Simard, Michel, "Translation Spotting for Translation Memories" Proceedings of the HLT-NAACL 2003 Workshop on Building and Using Parallel Texts: Data Driven Machine Translation and Beyond—vol. 3, [online] May 2003, pp. 65-72.

* cited by examiner

RESOURCE AUTHORING INCORPORATING ONTOLOGY

The present application is based on and claims the benefit of U.S. provisional patent application Ser. No. 60/659,616, filed Mar. 8, 2005, the content of which is hereby incorporated by reference in its entirety.

BACKGROUND OF THE INVENTION

The present invention deals with data processing.

Localization is a process of modifying products or services to account for differences in distinct markets. A very common example of localization occurs when an application is authored in a source language and is introduced into a market that uses a target language different from the original one. For instance, if an application were authored in the English language and then introduced into China, it would be localized by translating the various English language strings and UI elements (menus, icons, etc.), software components and user assistance in the application into Chinese. The UI layout and style (including font type, size, control positions, etc.) will also likely be changed to suit the target language. Of course, the concept of localization is broader than simply modifying language. Markets that use the same language may be distinct for other reasons. For instance, a software application may be "localized" for different age groups. It may have one set of language and appearance for adults and another for children or teens. Thus, localization illustratively accommodates for a wide variety of differences in distinct markets.

Although, as described above, localization involves many more things that just translating strings; to facilitate the reading of the document we will concentrate the description on that scenario. In a similar way, most of the examples are taken from the software localization field but the invention is not limited to software localization. Similarly, while much of the present discussion focuses on localizing a product, the invention is not so limited and is just as applicable to services, and thus the term "product" includes "services" for the sake of this description. In the past, there has not been a system-level attempt to provide localization but instead, localization has been performed using individual components to solve individual problems. For instance, a localizer may be augmented with certain machine translation techniques to improve localization speed, accuracy and consistency. However, a different localizer may use just translation memories in order to increase the recycle rate by reusing previous translations, hence providing a more consistent result at a higher speed than she would without tools.

Also, this has all been done, conventionally, in an offline way. In other words, the author creates an entire application or a large portion of a component, and that component or application is provided to a localizer for localization. The usual process is such that the localizer's interaction with the original author is minimal or non-existent. This makes it hard to introduce changes in the original content that would ease its localization. In fact, in many cases, localization is not performed until well after the entire product has been developed and a strategic marketing decision has been made to expand that product into a different market that uses a different language or is distinct in another way. In all of these cases, there is typically very little up front work done in developing an application with localization in mind or even optimizing for localization. Similarly, there is very little support, in the development/authoring stage, for developing an application or other product/service which will be relatively easy to localize, even though authoring a product or service which is easily localizable is no more difficult than authoring one that is not easy to localize.

Therefore, products, services and applications have traditionally been translated into different languages or otherwise localized through a complex, manual and labor intensive process. The cost for this localization of software products, and the translation of product related content, represents a significant hurdle which must be overcome in order to enter new markets. This is especially true for small to mid-size independent software vendors or content authors.

The problem of localization also scales depending on the particular location in which the software is developed. For developers that are authoring software in locations that have large markets, localizing the software to different (and likely smaller) markets is less of a need. However, if a developer authors in a location (and using a language) which has a relatively small market, the entire viability of the product may depend on the ability to localize that product into languages used in larger markets. This requires the manufacturers to spend an inordinately high amount of resources on localization. This often detracts from the resources available for development.

Another problem associated with prior localization efforts is that there has not been a good way to draw on the work of a variety of other localization sources. For instance, a wide variety of vendors localize their products for various markets. Similar applications, developed by different vendors may likely be localizing the same, or very similar, strings or software for the same markets. However, there is currently no expedient way for the two to draw on, or share, the efforts of one another. Therefore, there is a great deal of duplicated effort in localizing products.

Furthermore, there are many different programming models (such as Win32, CLR and WEB scripting) with different types of resource managers, resource formats and data stores. They require different parsers and tool sets to handle localization, which results in complex and costly processes, and inconsistencies in localization quality.

SUMMARY OF THE INVENTION

The present invention provides a system for processing data.

DETAILED DESCRIPTION OF ILLUSTRATIVE EMBODIMENTS

The present invention provides an operating system with an integrated localization platform, or a localization platform which has components closely operable with the operating system, although not fully integrated. The present localization platform can also be provided as a service that is requested by the operating system. The present invention utilizes the localization platform to localize content and software. The present invention can also be used during the development of products or services, implementing practices which enable quicker and more efficient localization of the product or service. The present discussion will proceed primarily with respect to translation during the localization process, but the invention is not so limited and localization includes a wide variety of other accommodations for distinct markets as well. Prior to describing the present invention in more detail, one embodiment of an environment in which the present invention can be used will be described.

Figure 1:
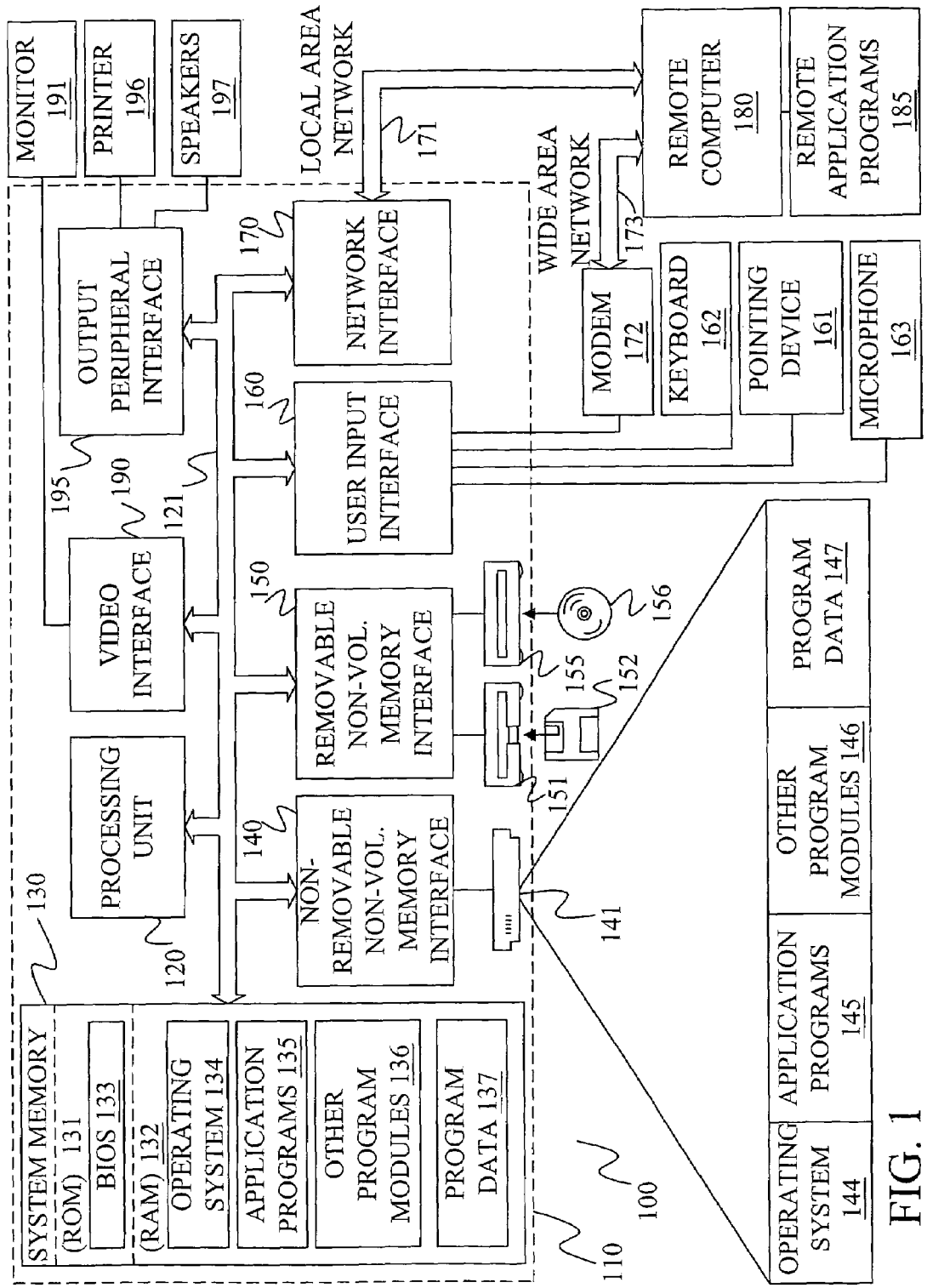
FIG. 1 is one illustrative embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
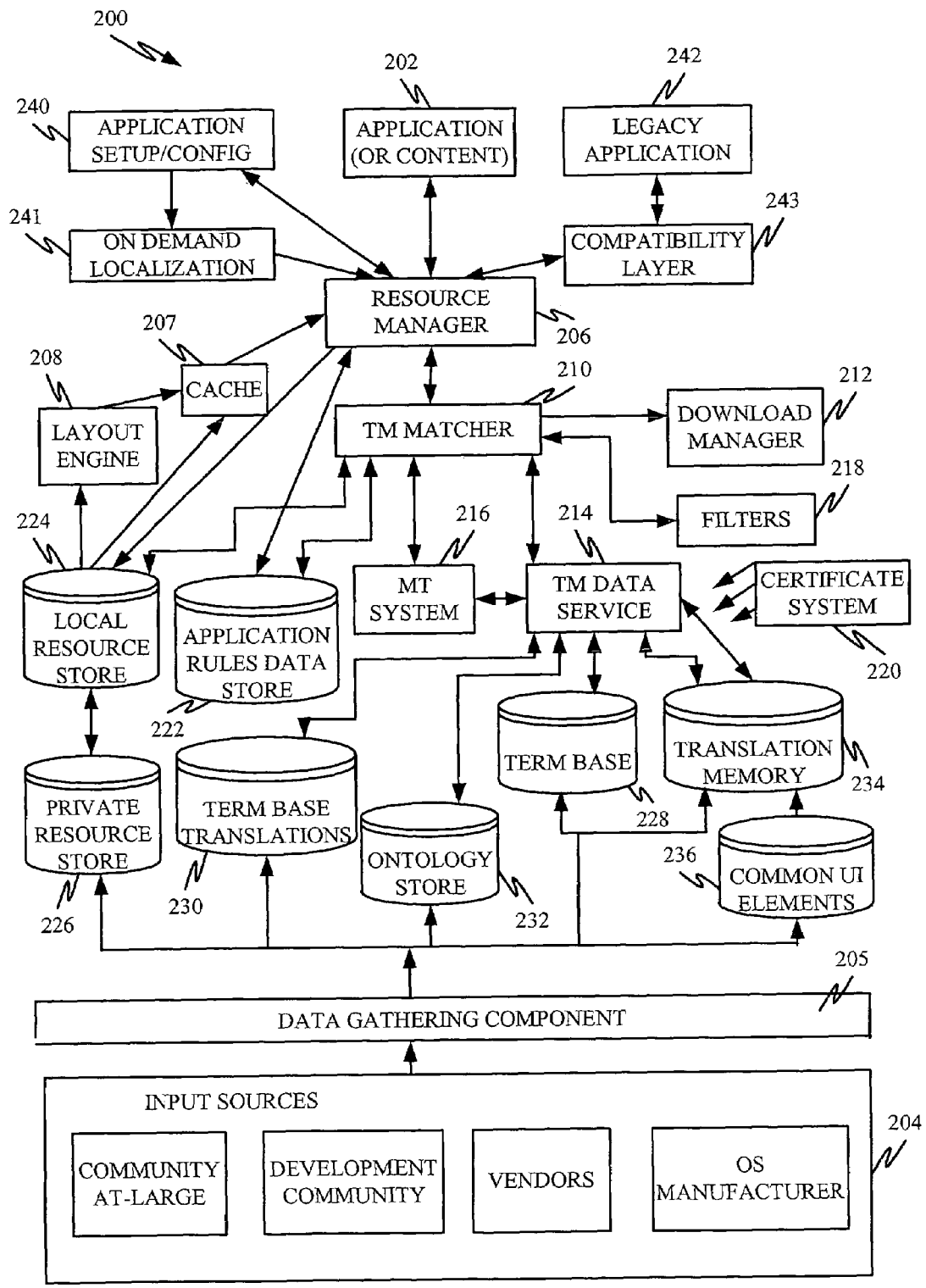
FIG. 2 is a more detailed block diagram of a runtime environment deploying aspects of the present invention.

FIG. 2 illustrates a localization platform (or system) 200 which is integrated into operating system 134 shown in FIG. 1. Localization platform 200 is shown with a number of different memory stores, and it will be appreciated that those memory stores can be embodied in any of the variety of storage devices shown in FIG. 1, or in different storages devices. System 200 is shown interactively arranged with an application 202 that will undergo localization and a variety of input sources 204 that input various translations into the data stores in system 200 through data gathering component 205.

System 200, itself, includes resource manager 206, layout engine 208, translation memory (TM) matcher 210, download manager 212, translation memory (TM) data service 214, machine translation (MT) system 216, filters 218, certificate system 220 and a plurality of different data stores. The data stores shown in FIG. 2 include application rules data store 222, local and private stores 224 and 226, respectively, term base data store 228 and term base translation data store 230, ontology store 232, translation memory 234 and common UI elements data store 236. In general, application rules are used in the resources to specify application-related rich data, while filters are used to ensure that entities (or input sources 204) contributing to data are only able to modify the data they contributed, and that all data added are filtered based on certain rules. Of course, the data stores can be grouped, merged or split differently, in any desired way. The detailed operation of system 200 is described later in the specification with respect to FIGS. 2-6. However, a brief discussion of the operation of system 200 and the items shown in FIG. 2 will now be undertaken.

During runtime, resource manager 206 loads the resources associated with application 202 into cache memory 207 (similar scenarios can be found for content and other type of localizable data). Resource manager 206 also receives calls from application 202 for resources. Resource manager 206, in response, first loads a string in a language that is associated with the locale currently selected by platform 200. Resource manager 206 decides which version of the resource to load based on a variety of criteria such as availability, confidence level, user settings, etc. Resource manager 206 may decide to invoke TM matcher 210. To do so, resource manager 206 calls TM matcher 210 to obtain a translation (or localization) of a specified resource. TM matcher 210 may also have pre-populated resource data to prevent run-time delays in resource loading; the pre-populated information will be tagged with relevant information such as whether it came from MT system 216 or TM matcher 210, its confidence source, etc. This is discussed in greater detail below. If TM matcher 210 does not return a match for the resource, resource manager 206 cascades through resource fallbacks so that translation can be provided in a different, fallback language. This is also described in greater detail below. Also, in one embodiment, both resource manager 206 and TM matcher 210 have fallbacks. They can be different from one another and although the results of TM matcher 210 can influence resource manager 206, resource manager 206 can decide to fallback without calling TM matcher 210.

It is not uncommon that changes made by localization on strings forces changes on the display items containing those strings. Common examples include the need for more space (longer strings), changes on the flow of a dialog (right to left languages vs. left to right languages), etc. The adjustment process can happen at localization time, at rendering time or both. The most common case is that rearrangement and resizing of the items in a dialog is needed, and the process is referred to as auto layout. The amount and correctness of the information provided during the authoring process will influence the results produced at runtime.

TM matcher 210 is situated between various sources of translations and resource manager 206, which requests content to be matched (or translated into another language or otherwise localized). TM matcher 210 searches the available sources (and those sources which are trusted by the application 202) to find a translation which has the highest confidence score associated with it.

Again, a more detailed discussion of the operation of TM matcher 210 is set out below with respect to FIG. 4. Briefly, however, TM matcher 210 accesses rules associated with application or content 202 in application rules data store 222 to ensure that whatever localization is provided back to resource manager 206 does not cause application 202 to malfunction. TM matcher 210 first searches local data store 224 and private data store 226 to see if a localization already exists. Local data store 224 holds translations or other localizations of resources which have already been localized, in case the request being made by resource manager 206 is one which has been made before.

TM matcher 210 also invokes TM data service 214. TM data service 214 accesses translation memory 234 which contains translations or other localizations of a wide variety of different things, such as common user interface (UI) elements stored in store 236, as well as defined terms stored in term base 228, and ontology store 232 provides context information for application 202 and an associated domain.

If no localizations already exist either locally on store 224 or 226, or remotely on store 234, TM matcher 210 can access an optionally available machine translation (MT) system 216 (or one of a plurality of available MT systems) to perform machine translation on the content to be localized. The decision by TM matcher 210 to invoke MT system 216 can be based on user preferences, the availability of a translation, the quality of available translations and MT-provided translations, etc. Machine translation system 216, in one embodiment, is any commercially available MT system and is illustratively only utilized for translations if there were no matches with a higher confidence level from any of the other memory sources (such as TM data service 214 and the local and private data stores 224 and 226). The fact that MT system 216 can be substantially any MT system, or any system capable of using the data in the different stores (e.g. previous translations) to produce translations, greatly enhances the extensibility of the system, because new or different MT systems can easily be utilized by TM matcher 210.

Of course, the MT system extensibility is not the only extensibility in the system, but is only one example. Some other examples of system extensibility include content authoring editors, language parsers, third party translation memories, community editors, development authoring environments, connection to web services, etc. Extensibility in these areas and others is supported by the APIs in platform 200.

In any case, each of the translation resources called upon by TM matcher 210 will illustratively provide TM matcher 210 with a confidence score (or translation rate, recycle rate, or other similar measure) indicative of the confidence or re-use rate associated with the localization being requested. TM matcher 210 can then select the localization or translation from the trusted source which provides the translation associated with the highest score. The translations are then downloaded by download manager 212 to local store 224, if they are not already stored there.

In one illustrative embodiment, a wide variety of input sources 204 can provide translation inputs to the various memories in system 200. For example, vendors or software manufacturers that develop operating systems that incorporate localization platform 200 will illustratively provide trusted terms to the various memories. However, in one embodiment, input sources 204 can include the community at large and the development community. The community at large allows anyone that performs localization services using system 200 to provide a suggested localization of a piece of content to the appropriate memory through data gathering component 205. The input sources 204 may also include the development community which will (as opposed to the community at large) store translations provided only by developers officially recognized as such. Thus, it can be seen that platform 200 allows the localization process to be opened up for community involvement on a very large scale as well as adjusted at a granular level (e.g. user decides what to trust and what not) to meet the user's needs and expectations.

Further, data gathering component can dynamically (during set-up, runtime, configuration, etc.) intermittently collect new data from a variety of input sources 204. The new data can of course be new resource data as well as pre-localized data or translation memory data, to support new applications, new domains, and to perform self-turning of a running operating system. This embraces adaptability and accuracy of the system.

However, a particular application developer, system administrator or user may desire that only certain localization content be trusted. The developer may, for instance, not wish to trust localization content from the community at large or the development community, but only from vendors and OS manufacturers. This allows a developer or user to set the extent to which the platform 200 opens the localization tasks to different sources. This can be set even on a string-by-string basis.

In one such embodiment, system 200 includes certificate system 220 which attaches certificates to content provided by certain sources. In that instance, the developer of application 202 may desire that only localization content with an attached certificate be trusted. For instance, developers and other contributors might be able to obtain the right to sign their content which is relative to the tier they are in, in relation to their application. That means that a certificate of the developer of an application puts that developer in the developer tier for that specific application and all other contributors are one tier down in the "other ISV", community or user tier. The certificates can be trusted relative to the tier of the contributor. For instance, a given manufacturer might always have the highest tier, but from that tier on down the user can determine a trusted tier and within a tier trusted sources. The indication as to which localization content is to be trusted by any given application 202 or by any user may be stored in the application rules data store 222. The certificates help to establish a trust system for translations.

The user or developer can also choose hierarchical trusted sources. For instance, based on the origin of the localization content, a user can determine whether to trust only the OS manufacturer, and if none is available, then to trust independent software vendor translations, and if those are not available, only then to trust the development community, and so on. In one illustrative embodiment, this hierarchy is established by default, but a user can simply accept or override it with personal settings. Such settings can be implemented in the application rules associated with each application or with an individual machine running the application.

Also, it should be noted that private store 226 is similar to local store 224, in that it resides on a user's data store. However, local store 224 is illustratively a system wide store while private store 226 is a store which can be used to indicate trusted localization content corresponding to an individual user including data entered by the user for their own private use. Therefore, each individual user may identify different trusted localization content. That content is identified to that particular user in private store 226. This allows an individual user to customize the localization process even further than that associated with an individual application. For instance, the user can make changes to his or her own applications, as needed and allowed by the application. The user can also share local or private stores back to the community.

In addition, certain translations can be locked so that they are not modified. This can be critically important for avoiding potentially malicious translations. For instance, one of the input sources might provide a malicious translation which would translate the term "Click here to format your hard drive" as "Click here to continue."

Once TM matcher 210 obtains a desired localization for the request from resource manager 206, it applies filters 218 and application rules from store 222. Filters 218 illustratively define terms which are not to be placed in any localization content in any given language. For instance, some users may desire to filter obscene terms or any other objectionable content. Therefore, filters 218 are applied prior to using the localized content requested by resource manager 206. It will be noted that applying filters (as well as any other type of validation) is one step in localization and can be applied at many steps in the process, such as editing, downloading, using, etc.

For instance, validation, in general, occurs whenever two components exchange data, unless the components completely trust one another, and the channel used to communicate is also trusted (such as against surreptitious activity). Therefore, for instance, if resources are downloaded from a trusted source, and the resources contain a valid signature, no other validation (other than validating the signature) needs to be done. If the source is trusted but the file is not signed then the channel used to transport the information is evaluated to determine whether it is also trusted. For example an unsigned file that has been downloaded from the internet is more likely to be tampered with than an unsigned file that a user copied from another folder in the same computer. Depending on several factors it may decide to undertake a quick functional validation, or some additional content validation may be conducted, such as checking for offensive words or to ensure terms in the original resource are present on the target resource (e.g., so "menu" is not translated as "folder").

Application setup/configuration component 240 is used during setup and post setup configuration. During setup, application 202 registers its resources with local resource store 224. Component 240 illustratively exposes a user interface which allows the user to localize the application to a target language supported by the platform if it is not already localized. The user interface can allow the user to explicitly select the target language. On-demand localization component 241 passes these requests to resource manager 206 and also possibly to TM matcher 210.

Legacy application 242 represents applications that were developed and are not aware of platform 200. Compatibility layer 243 supports existing resource interfaces used by application 242, and redirects calls to resource manager 206.

Figure 3:
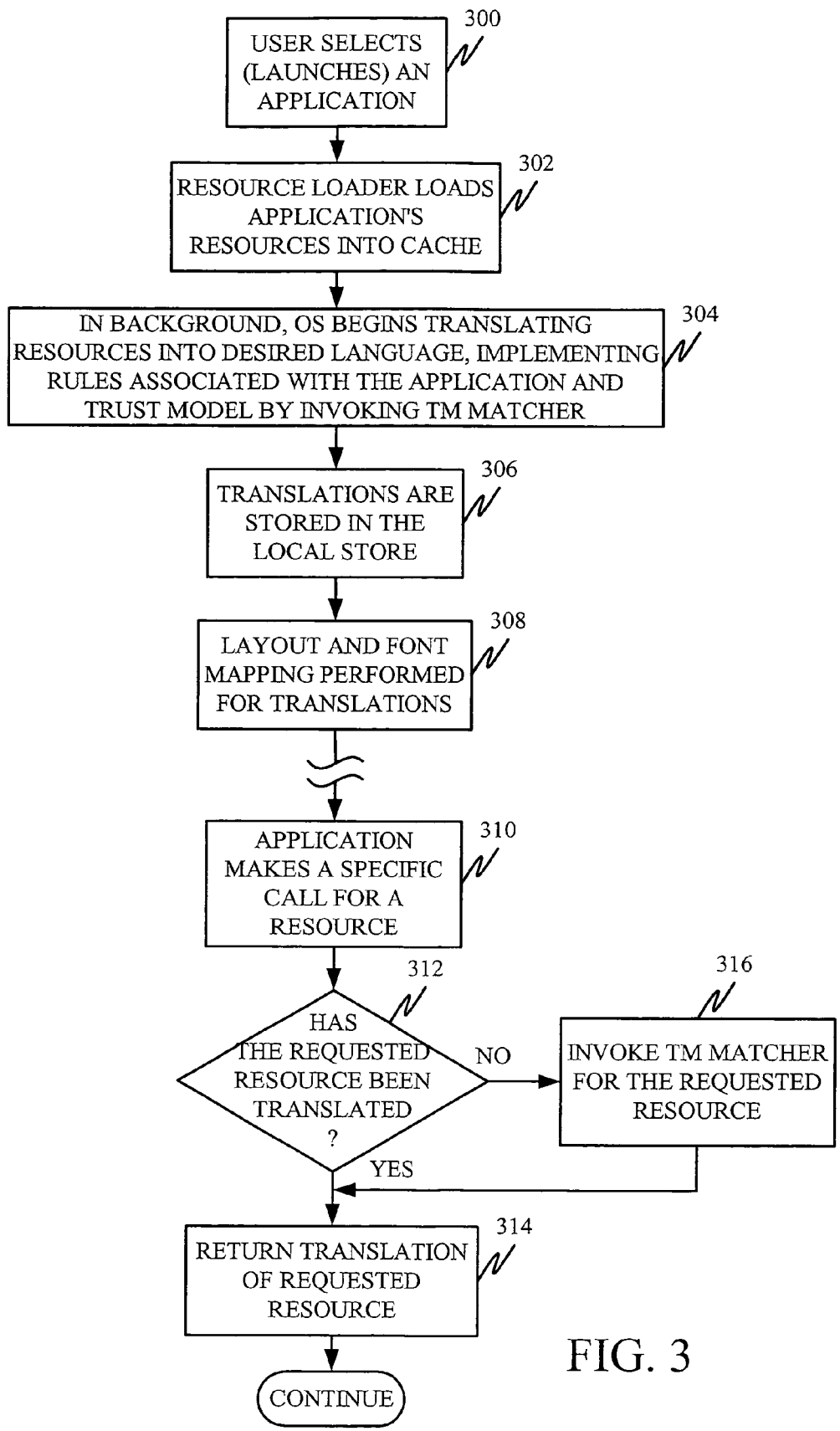
FIG. 3 is a flow diagram illustrating the overall operation of the platform (or system) shown in FIG. 2 in which a translation is unavailable.

FIG. 3 is a flow diagram which illustrates the operation of platform 200 in greater detail, in accordance with one embodiment of the present invention. During run time, a user first selects or launches an application 202. This is indicated by block 300 in FIG. 3. Next, in this embodiment, resource manager 206 loads the needed resources associated with the application 202 into cache memory 207 (or into another storage device, all of which will be referred to herein as "cache", in this context). This is indicated by block 302.

In the background, the operating system (and in particular the localization platform 200) begins translating the resources in cache 207 to the desired language. In doing so, platform 200 implements the application rules 222 associated with application 202, and the trust model (i.e., the trusted localization sources) associated with application 202 or the user (whichever apply). Resource manager 206 invokes TM matcher 210 for the resources stored in cache 207 to obtain their localized value. Localization of the resources loaded into cache 207, in the background, is indicated by block 304, in FIG. 3.

It should also be noted that populating the localized resources for an application need not wait until runtime. Instead, it can be done during set-up or at another time. In addition, some parts of localization can be run at run-time while others can be done at setup or another time. For instance, some of the more computationally expensive or time consuming tasks can be performed in the background, during setup or at another time, while the quicker tasks may be performed at runtime. In still another embodiment, the tasks can be assigned (by the user) to be performed at any specific time and the status of those tasks can be displayed as well.

As the resources are localized in the background, not only are the localized values stored in cache 207, but they are also placed in local store 224. Therefore, the next time that application 202 is launched, the localization process will be much quicker, because all of those resource values that have been localized will already be located in local store 224. Thus, TM matcher 210 need not search TM data service 214 or have the values translated using machine translation system 216, because the localizations will be remembered by the system. Instead, they can simply be retrieved from local store 224. Storing the translations in local store 224 is indicated by block 306 in FIG. 3. Also, on demand, entire translations can be loaded into local store 224 using download manager 212.

Of course, the present system can also check for updates. For instance, a non-ideal translation might initially be chosen because none better can be located. Later, however, a better translation might be loaded into one of the memories by one of the sources 204. The resource can then be periodically updated to accommodate this.

Similarly, code updates might make previously localized resources invalid. Therefore, in one embodiment, code changes trigger re-localization of some or all of the resources.

As the resource translations are made, layout engine 208 identify certain translations that will require modifications to the layout of the display for the application. In addition, the fonts used in the source language in the application are mapped to the fonts in the target language. This can be done by layout engine 208 or other components at runtime or at a previous time. Layout and font mapping is indicated by block 308 in FIG. 3.

In this way, localization platform 200 in the operating system continues to localize the resources associated with the application 202 and stored in cache 207. It may happen, however, that the application makes a request for a resource that has not yet been localized in the background. Such a request is indicated by block 310 in FIG. 3. Resource manager 206 first determines whether the requested resource has already been localized and stored in cache 207. This is indicated by block 312 in FIG. 3. If so, the localization of the requested resource is simply returned from cache memory 207 to the application 202. This is indicated by block 314.

However, if the resource has not yet been localized in the background and stored in cache 207, then resource manager 206 requests localization of the resource from TM matcher 210. TM matcher 210 then requests localization of the resource from the various sources, which it has access to, and returns the localization of the requested resource. Invoking the TM matcher 210 is indicated by block 316 in FIG. 3. The operation of TM matcher 210 is described in more detail with respect to FIG. 4.

By localizing the resources in cache 207 in the background, localization platform 200 departs significantly from prior systems. Prior systems load the cache with the resources.

However, this leads to significant disadvantages in localization. If the localization platform waits for the application to request a resource in order to localize it, on the fly by invoking MT, this likely results in an undesirable delay in the operation of application 202 or the results will be limited by the set of algorithms that can be used in such a constrained environment (performance requirements can limit accuracy). Current machine translation technology requires approximately one-half a second to translate a sentence. While on-the-fly translation and other localization is certainly contemplated by the present invention, translating all of the resources on-the-fly, using machine translation system 216, likely results in an undue delay in the operation of the application. Of course, if a substantial number of the resources had been localized before and are stored in local store 224 or private store 226, or if they were stored in translation memory 234, and only a relatively small portion of the resources needed to be translated by MT system 216, then localization of cache 207 in the background is not as important to avoid compromising the operation of application 202.

In any case, TM matcher 210 continues to localize the values in cache 207, either in the background, and/or on-the-fly. TM matcher 210 continues until all the resources are localized.

In general, TM matcher 210 can work against one or more data stores. It can optionally integrate with other recycle engines (such as TM matchers or MT systems). It can optionally take advantage of terminologies along with their translations and relationships (ontologies). It can use metadata to decide which pieces of data in the stores are supposed to constitute the search space (such as domain area, author, approval status, or other metadata). It can look at restrictions (application rules/filters) on the string itself and take advantage of those to produce a better match or a match that will be more readily validated. Of course, these features are all optional and more may be added or these can be changed or deleted from the TM matcher operation, as desired.

Figure 4:
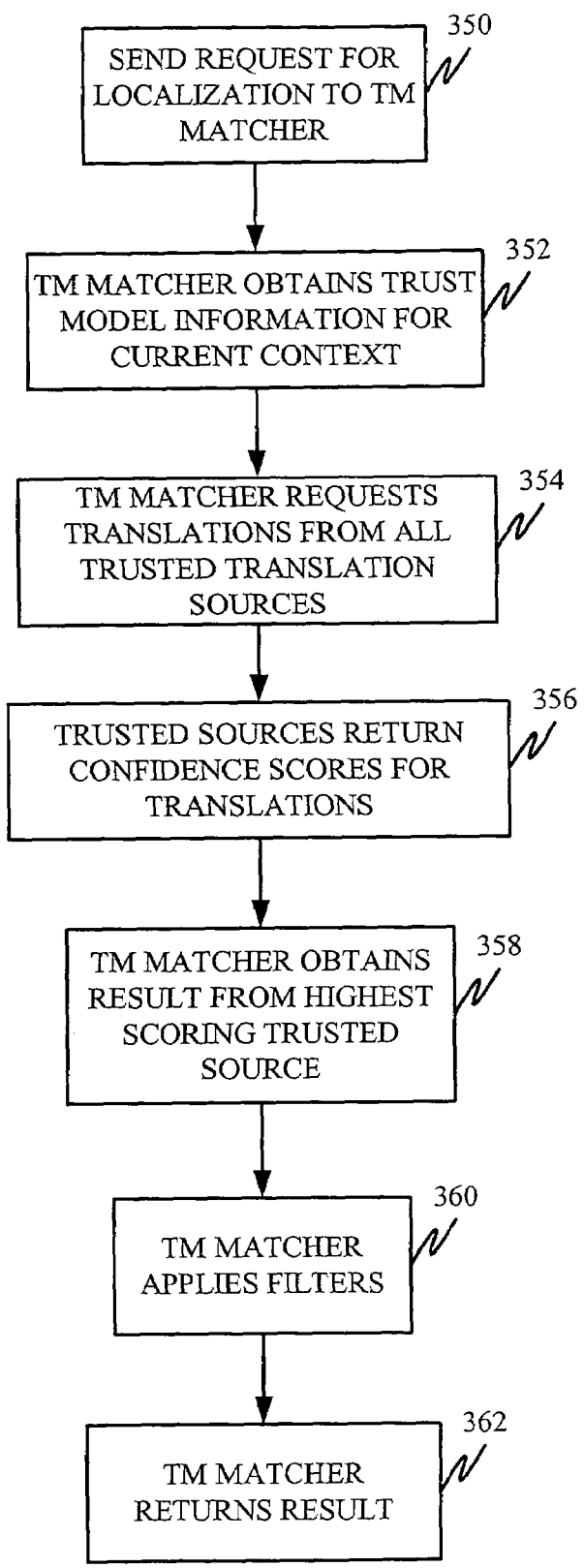
FIG. 4 is a flow diagram illustrating the operation of a matching component shown in FIG. 2.

FIG. 4 is a flow diagram illustrating one embodiment of the operation of TM matcher 210 in more detail, for the sake of example only. Resource manager 206 first provides TM matcher 210 with a request for localization. This is indicated by block 350 in FIG. 4. TM matcher 210 then obtains trust model information for the current context. In one embodiment, the trust model information is stored with the data itself, but might also be stored in private store 226 or in any other source that identifies any other items of context upon which trusted localization sources are to be determined given the present context. The trust model information can include an indication of which sources are trusted, or a list of requirements which must be met for a localized item to be valid and considered. This assists in update scenarios as well. Updates on code may change the set of constraints that resources have to meet. Those changes will require re-validation of previously assumed valid resources. This is indicated by block 352 in FIG. 4.

TM matcher 210 then illustratively requests localizations of the resource from all trusted localization sources, but may do so in a given order. The order and the number of sources checked illustratively varies depending on the circumstances (such as whether the localization is taking place at run-time, setup time, in batch processing, etc.). This is indicated by block 354. In other words, in one embodiment, TM matcher 210 does not even request a translation from non-trusted sources. In that instance, assume that the user does not wish to trust translations from the community at large or from the development community in input sources 204. TM matcher 210 will only ask for localization content which originated from trusted sources, and will thereby exclude all of the localization content provided by the community at large and development community. Of course, the TM matcher 210 will modify the sources from which localization results are requested based upon the trusted sources given the present context.

In response to the request from TM matcher 210, the various sources which have been requested for localization content return their associated confidence scores. For instance, it is very common for translation results to have an associated confidence level indicative of how likely it is that the translation is correct given the input in the source language. It is not important for purposes of the present invention what particular measure is used to indicate the confidence associated with a translation or other localization. In the illustrative embodiment, the scores from all sources either use the same measure, or measures which are correlated to one another, so that TM matcher 210 can determine the relative magnitude of the scores. Returning the confidence scores associated with the translations (or localization content) is indicated by block 356 in FIG. 4.

TM matcher 210 then obtains the localized content (e.g., the translation) from the highest scoring trusted source. This is indicated by block 358. Also, TM matcher 210 can select localized content based on other or additional criteria as well, such as the time required to obtain the localized content, how close the localized content is to the target market, validation criteria or other criteria or any combination of criteria. In addition, the TM matcher can retrieve localization content from multiple sources and combine them.

Once the translation is received, TM matcher 210 applies the filters 218 and other validation to ensure that the localization content (or translation) is appropriate given the application and context and any filters or validation criteria desired by the user. Applying the filters and other validation is indicated by block 360 in FIG. 4. TM matcher 210 also illustratively applies the application rules such that the localization content retrieved for the given resource will not inhibit operation of the application or cause improper operation or otherwise crash, the application. It should also be noted that some of the filtering and validation processing can be pre-computed, rather than waiting to perform all necessary steps at this point in the process.

Once this is done, TM matcher 210 returns the result to resource manager 206. This is indicated by block 362. It will be appreciated that this process will be performed anytime TM matcher 210 is invoked by resource manager 206. Thus, the process will be performed when the resources in cache 207 are being localized in the background, and it will be performed when an application 202 makes a call for a not, as yet, localized resource.

In either case, TM matcher 210 may find that there is no translation available in the desired language or the confidence scores returned are below a given threshold, but that a translation must be undertaken using machine translation system 216. At that point, in one embodiment, resource manager 206 is notified, and may request TM matcher 210 to look for a translation in a fallback language. For instance, if the target language is Catalan, application 202 may request translation of a resource, but one may not be available in Catalan. However, resource manager 206 may be configured such that Spanish is a first fallback language to Catalan. In that case, TM matcher 210 returns to resource manager 206 indicating that no translation is available in Catalan and that machine translation system 216 must be invoked to obtain such a translation (alternatively, MT system 216 can be called on the first call by TM matcher 210). Resource manager 206 may, instead of taking the performance penalty associated with on-the-fly machine translation, simply request TM matcher 210 to return a translation of the requested resource in Spanish. If one is available, it is returned by TM matcher 210.

Of course, as indicated above, the fallback locales/languages may be hierarchally cascaded to any desired degree such that various locales are fallbacks for various other locales, the ultimate fallback of which may be the source language. Thus, if the ultimate fall back is reached, instead of providing a translation of the requested resource, resource manager 206 simply returns to the application 202 the requested resource in an ultimate fallback which is ensured by the platform so the application will not crash or lose an interaction point with the user because of the platform.

The user can also illustratively set how the fallback hierarchy works. For instance, the user can indicate that displaying a group of resources together (e.g., a dialog with several strings) can show parts of the dialog in one language (or localized to one market) and parts in another (e.g., in the fallback). Other users may indicate that the displayed group of resources is to all be in one language (or localized to the same market).

It will also be noted that the user need not launch the application to have it translated by platform 200. The user can simply select an application or other software component for localization, and platform 200 can localize it in the background. For instance, in one embodiment, the user right clicks on an application and, from a menu, selects "Localize". Platform 200 then begins localizing the application in the background, storing the localized content in the local store. Content can also be localized in the background. In one embodiment the user right clicks on a document that is stored in the file system or on a server and chooses "Localize". The localization platform will localize the document in the background. The same applies to documents that are downloaded from the internet.

In addition, when an application is installed (or at a later time) the user can select a plurality of different languages for installation. These languages are then loaded into the local data store 224. The translations can be stored on the product compact disc, or other medium.

Figure 5:
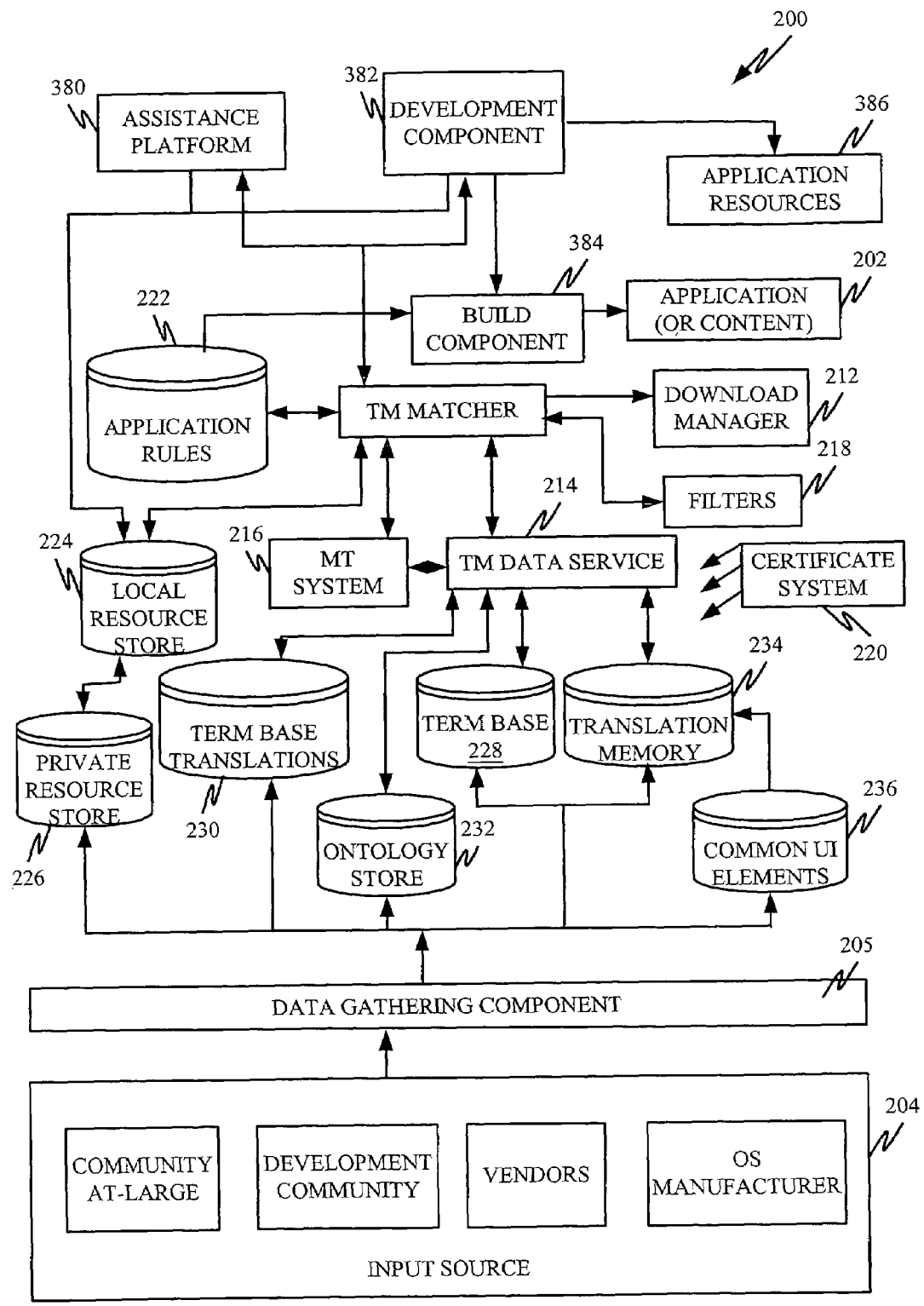
FIG. 5 is a more detailed block diagram of the localization platform (or system) shown in FIG. 2, as used during development of an application or other content.
Figure 6:
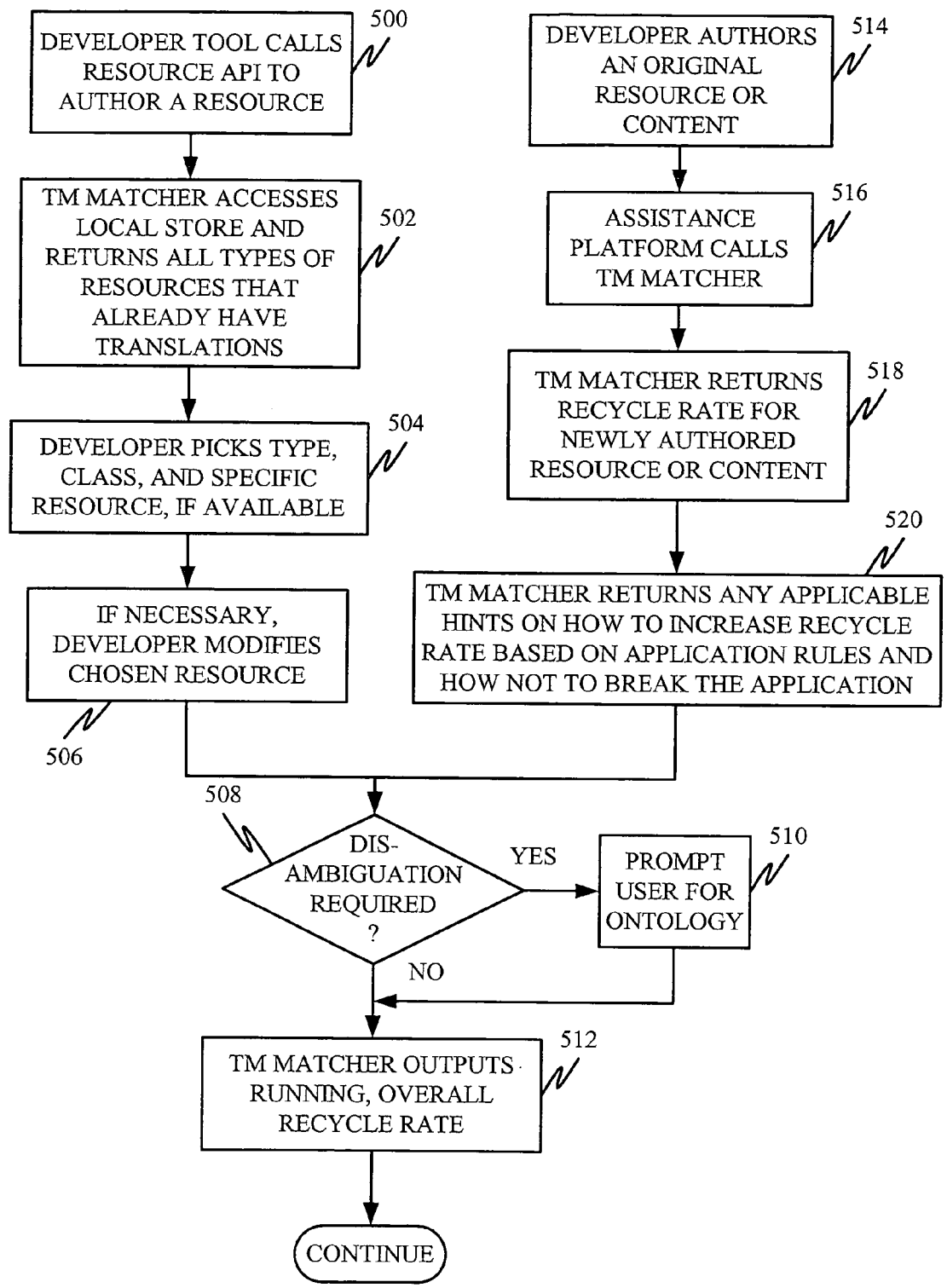
FIG. 6 is a flow diagram illustrating how a product can be developed implementing techniques that aid in later localization, in accordance with one embodiment of the present invention.

FIG. 5 is a block diagram illustrating the components of platform 200 in the development context. A large number of items are similar to those shown in FIG. 2 and are similarly numbered.

FIG. 5 shows assistance platform 380 and development component 382. Development component 382 can be any desirable development component such as Visual Studio available from Microsoft Corporation of Redmond, Wash., or any other desired development component for authoring software. Assistance platform 380 assists in authoring content by interacting with one or more components of platform 200, such as translation platform 381 to allow the developer to develop a product which has a high recycle rate, and thus a greatly reduced cost for localization into different languages. Both development component 382 and assistance platform 380 consume services provided by platform 200. In doing so, development component 382 and assistance platform 380 in conjunction with the other components build in certain practices into the front end development/authoring process which will likely greatly enhance the ability of the product to be localized to enter into various different markets and thus to greatly increase the return on the development investment.

Build component 384 uses the information provided by the localization platform and/or assistance platform 380 or any other content authoring tool that can access the localization platform through the APIs and the application rules in data store 222 and builds application 202 as well as content documents.

It will also be noted that the present discussion of FIG. 5 proceeds generally with respect to the developer developing an application or an author authoring content. However, the system can be used for a variety of things regardless of the type of content or software the developer is developing or the author is authoring.

In accordance with one embodiment of the present invention, there are two ways for a developer or author respectively to use development component 382 to develop software or assistance platform 380 to develop content. The first is to use a feature in her authoring/development environment that, through a platform application programming interface (API) or other similar mechanism determines whether any similar content or software has already been developed, and is stored in any of the memories in platform 200. The second way is for the developer to simply develop the software or content (original or not). In the latter case, platform 200 simply acts to provide the developer with feedback as to the recycle rate (e.g., the amount of content/software which can be translated into different languages in platform 200 given previous translations) of the content/software and to suggest practices that will likely increase the recycle rate and also to suggest practices that will inhibit the application from malfunctioning after localization.

In accordance with the first embodiment, the content author provides an input through assistance platform 380, and assistance platform 380 calls an API or other similar mechanism to author a resource. This is indicated by block 500 in FIG. 6. Assistance platform 380 then invokes TM matcher 210 to access local store 224 and returns all types of resources that already have translations. This is indicated by block 502 in FIG. 6. For instance, the developer platform may invoke an API indicating that the content developer wishes to author a resource. In response, the platform 380 returns an indication of all of the different classes of resources which are contained in platform 200 and which already have translations into a variety of different languages. Assume, for example, that the result from the platform and presented to the user by the developer platform are the classes "menus", and "error messages".

Through the exposed functionality in the API, the developer can choose the "error message" classes and assistance platform 380 requests this information of platform 200 (it may be store in any memory) then returns all of the different classes of error messages which are contained in platform 200. The developer then selects one of the classes of error messages, and platform 380 returns all of the specific error messages associated with that class. The user can then simply select one of the error messages, which has already been authored, and for which localization will already be highly efficient (e.g., because it has already been translated into a variety of different languages or otherwise localized). The developer selecting the type, class and specific resource, if available, is indicated by block 504 in FIG. 6.

It will also be appreciated, of course, that the specific, exact message which the developer wishes to author may not be already available. In that case, the user can select a very close message and modify it. The modified message will likely, in many cases, be able to be localized quite efficiently, because the majority of it was already in existence in localization platform 200. In any case, choosing a similar, not identical message will result in a confidence penalty. Modifying a chosen resource is indicated by block 506 in FIG. 6.

This type of recycling provides the author with a high degree of flexibility relative to a prior art localizer that occurs after development. For instance, the author can change the number of placeables on a software string, while a traditional localizer is far more restricted. Also, the author can entirely replace a source sentence (assuming the key terms are maintained) while a traditional localizer may not be able to. Consider the sentence for an error message: "file {0} does not exist." The author can change this to "file {0} on drive {1} could not be found.", whereas a conventional localizer cannot use the translation of the first sentence as a translation for the second one because, without access to the code, the conventional localizer is not able to change the underlying assumptions in the code regarding the number of placeables. The recycling may not only be done with respect to text found in messages, but can also be done with respect to common UI elements in data store 236. Reusing prior UI elements also enhances the recycle rate and localization of the product.

During development, the developer may also wish to provide ontology-to-ontology store 232. Ontology is a specification of a conceptualization and describes the relationships between terms, which allows semantic encoding of content and strings. One embodiment of an ontology is set out in U.S. Pat. Nos. 6,253,170 and 6,098,033. Another description of ontology is set out in Gruber, A TRANSLATION APPROACH TO PORTABLE ONTOLOGIES, Knowledge Acquisition, 5(2):199-220 (1993).

In general, words are translated differently depending on context. Specifically, words or terms can be translated differently depending on application context in software localization. The localization platform 200 has access to semantic data in the form of ontology data store 282 that describes the relationship between terms. Ontologies can be generated manually by entering semantic information together with the word or term or automatically by applying algorithms that are able to determine the semantic context by the proximity of a words or term to other words or terms. The data store 282 is illustratively populated by structures and application context derived from the resource format. The type of semantic encoding in ontology store 282 allows platform 200 to disambiguate the semantics for the resources to be translated, while also providing powerful search capabilities, because it allows for query disambiguation as well. Translation platform 381 determines whether disambiguation is required at block 508 in FIG. 6. If so, ontology store 232 can be accessed to obtain disambiguating semantic information, or assistance platform 380 can request the disambiguating semantic information from the author, the same way the development component 382 can do the same to the developer. This is indicated by block 510 in FIG. 6.

As the developer continues developing the product, each of the authored resources is subjected to a localization rate estimate by translation platform 381 in platform 200. In estimating the localization rate of the authored resources, translation platform 381 identifies the percentages of those resources which have already been translated (or otherwise localized) and which reside somewhere on platform 200. Translation platform 381 also accounts for the requirement to subject the resources to machine translation by system 216, and also takes into account the confidence scores associated with each of the translations residing on platform 200. These items are combined to provide a recycle rate which is a measure of how easy the product being authored will be to localize into markets operating under different languages. Providing the running, overall recycle rate is indicated by block 512 in FIG. 6.

It will be noted that the recycle rate can be used in a wide variety of different ways. For instance, if the developer is only developing a component of an entire system, the component may be required to meet a certain recycle rate threshold before it is allowed to be checked in. Similarly, the recycle rate may well be indicative of the value of the product given how likely it is that the product will be introduced into other markets. Of course, this recycle rate can be used in a wide variety of other ways as well.

It should also be noted that the system can calculate the recycle rate for code which is not developed on the platform. The code can simply be provided to platform 200 and TM matcher 210 can calculate the recycle rate for the code, as a whole, and return it, as desired. This can be used in deciding whether to roll a product out into new markets or even whether to purchase rights in the product.

The discussion now proceeds with respect to the embodiment in which the developer is not choosing already-existing resources. Assuming that the developer does not wish to select from pre-authored resources, the developer can author original resources or content. This is indicated by block 514 in FIG. 6. In that case, the developer simply authors a portion of the content and assistance platform 380 calls TM matcher 210 to determine a recycle rate for the authored content. This is indicated by block 516 in FIG. 6. TM matcher 210 then accesses its localization sources and returns a recycle rate for the newly authored resource or content. This is indicated by block 518 in FIG. 6.

At this point, platform 200 can also be used to notify the author as to practices which may help the author improve the recycle rate of the product under development, or to alert the author to certain practices which may cause the application to malfunction once it is localized. Returning these hints is indicated by block 520 in FIG. 6. In one embodiment, these hints are provided even if the source of the product is being re-used. The fact that it is being re-used may, of course, mean that some of the checks have already been performed.

Some examples of practices that might affect recycle rate or application function include, for instance, writing long strings. Long strings are not just harder to understand, they are also more difficult to translate. In addition software presents the risk of a buffer overrun that would crash the application. Other practices that may affect recycle rate or application function include the use of special characters or the use of improper, or informal grammar. Using proper grammar constructs leads to a great increase in the ability to translate the text. TM matcher 210 thus provides a real time feedback as to the recycle rate of the code and practice tips.

Also, platform 200 can take certain actions to reduce a negative affect of these problem areas in the content under analysis. These actions will reduce the likelihood that an application will crash after undergoing localization. Platform 200 can alert the user that these remedial actions will be taken.

A number of other items should be noted with respect to the present invention. First, it illustratively provides hot key automation. Translation platform 381 illustratively tracks hot keys that are displayed on any given UI in order to avoid two functions being assigned to the same hot key on a given UI. Translation platform 381 can be invoked to select a hot key automatically, or it can be simply invoked to check to ensure that no hot key duplication is undertaken on a given UI. In order to be able to select or suggest a hotkey to the user the platform needs information regarding which items are available to the user simultaneously so it can avoid repetitions. That information is closely related to the one needed to render the information into the user's computer.

The present invention can also provide validation and simulation of a runtime environment. Once the developer has authored the component, the developer can invoke an API on development platform 382 and platform 200 will simulate a runtime environment under which localization is required. The runtime simulation allows the developer to physically see the display on the display screen, after it has been localized. This allows the developer to scan for bugs, gauge the aesthetic appeal of the displays and to make changes, as desired.

The present invention thus enhances the ability of a developer to reuse already developed content. This significantly enhances the recycle rate and localization of the product.

Further, the present invention provides a system that intelligently combines localized content from the operating system, applications, the community and third parties, and from machine translation. The resource manager loads resources of an application by returning requested resources according to needed language or other cultural or market criteria from a variety of sources or data stores (also referred to as localization content components).

In addition, the localization platform can be used to provide localized data to a wide variety of requesting entities, such as applications, browsers, search engines, resource loaders, authoring tools, etc.

Also, by allowing the community and community at large to suggest localization alternatives, the present invention allows community standard localization to be defined, and, at times, enables localization into some very small markets. For instances, the present invention allows a user to localize an English language application for Swahili. The user may provide this localization back to platform 200 as a suggested translation of the various resources in the application. Other South African users can choose to trust this localized content and download it in Swahili, or to localize it themselves or modify the localization and provide their own localization back to platform 200. In this way, the application can be localized and revised and made available in a market where it might otherwise not be due to small market size.

In one embodiment, when an input source 204 provides data, data gathering component 205 also records metadata, such as origin, usage, context information (such as resource versioning), confidence level, attributes, machine translation hints, etc. Other data can be collected and sorted as well. Also, in one embodiment, only the input source 204 that provided data can change that data.

The present invention not only provides for downloading translations from a community, but uploading them as well. In addition, source strings can be uploaded/downloaded in a similar manner.

It will also be noted that third party companies and communities can add new source and translation memories to platform 200. In one illustrative embodiment, platform 200 provides a web page or web service that enables the addition of a new source term and its metadata. The users will illustratively be authenticated so that platform 200 can determine the source of each newly added item.

In addition, platform 200 will illustratively work according to a published schema (such as an XML schema) which enables users to upload several strings at once. Again, the source of each string is known since every operation may require authentication. Such source strings can illustratively be added with one or more translations. The platform 200 operates similarly with respect to terms in the term databases.

Also, in accordance with one embodiment, communities are able to provide translations to the source strings in platform 200. When editing translations, the metadata present in the source is illustratively available to the "translator" and the metadata is enforced prior to accepting the translation. This can be done over a simple web interface. These translations can be used by other people, if the user chooses to share his or her translations with the community.

The present invention also illustratively allows the community to review translations that already exist on platform 200. This allows a source of translations to determine how many times his or her translations have been chosen by other users. This will enable input sources in the community to build a name for themselves based on the quality of work, and this drives input sources to do a better job so as to become more valued in the community.

In accordance with yet another embodiment of the present invention, when a developer uploads an application for translation, the developer is provided with an opportunity to enable end users to download their own localized version of the product. If that option is enabled, the user can log into platform 200 and pick which language, engines and translations to use in order to generate a personal version of the product.

For example, the user can ask for the "xyz" version of a product while specifying only exact matches of translation engines using translation memories that the community (or a specific user) has approved. This process can be periodically repeated to obtain a higher percentage of resource translation. Platform 200 can also provides for notifications to users via mail or other alert services when new translations are available.

In accordance with another embodiment, a third party can add a new source verification (or translation) engine to platform 200. As discussed above, a developer can submit an application to platform 200 to determine whether an application is highly localizable. Third parties can write new engines to support this. When a third party develops an engine that meets the criteria to perform source verification (e.g., when it implements a desired interface), then the third party can upload it to platform 200 and charge back for users to download the engine. As with the other parts of the processes described with respect to the present invention, signing and authentication are illustratively used to ensure that the source of the engine is known and the user has decided to trust that source.

Translation engines can be added in a similar way, but may illustratively run on the server implementing platform 200 with steps taken to ensure that the translation engine does not corrupt any already existing translation data. In addition, the present invention performs globalization and linguistic checks to assist authors. The present invention also allows the community to help an author. For instance, the community can be asked for a source string on a dialog box in a certain domain, where the source string can be easily localized. This assists the author at the outset in authoring highly localizable content.

It should also be noted that, while certain functions are assigned to certain components in the embodiment described, that need not be the case. The functions could be performed by different components and so some components could be deleted, modified or added, all within the scope of the present invention.

It can thus be seen that the present invention consolidates data for localization from past localizations of a wide variety of products and a wide variety of input sources. Instead of each application or product having its own memory of translations, which are not accessible by other products, the platform 200 makes this information available, as desired by the developer or user, to subsequent localization of different products. It also changes the localization process such that end-users have access to a wider degree of options to customize (localize) their computer experience. It also enables community participation into the process. As a consequence, the localization task itself becomes product independent, only linked to the product through the application context. Other applications can access the localized strings at any time if the trust model and application context allow for that.

Although the present invention has been described with reference to particular embodiments, workers skilled in the art will recognize that changes may be made in form and detail without departing from the spirit and scope of the invention.

What is claimed is:

1. A localization platform embodied in a computer readable storage medium operably coupled to an operating system, the localization platform being configured to provide localization data for a plurality of applications, the localization platform comprising:
   a plurality of localization components providing localized data that is localized to one or more distinct markets, wherein the plurality of localization components comprise a plurality of reusable localization components having localized data that is reusable across multiple applications;
   an ontology store storing ontology information; and
   a translation matching component configured to receive a localization request and input data from an authoring component utilized by an application developer to develop a plurality of resources associated with an application, the input data comprising the plurality of resources associated with the application;
   wherein the translation matching component accesses the plurality of localization components and the ontology store to disambiguate data associated with a particular resource to be localized based on the localization request, and wherein the translation matching component selects and outputs localized data from one or more of the plurality of localization components based on predetermined criteria and the disambiguated data; and
   wherein the translation matching component receives the plurality of resources from the authoring component during authoring of the application and the localization platform is configured to provide feedback to the application developer that includes an indication of a recycle rate of the plurality of resources, the recycle rate being indicative of information in the plurality of reusable localization components from previous localization operations for other applications.

2. The localization platform of claim 1 wherein the localization components, the ontology store and the translation matching component are integrated with an operating system.

3. The localization platform of claim 1 wherein the localization components provide confidence scores associated with localized data, given the input data and wherein the translation matching component is configured to select the localized data based on the confidence scores, the selection involving an evaluation of a relative magnitude of a confidence score associated with a first item of localized data as compared to a confidence score associated with a second item of localized data.

4. The localization platform of claim 1 wherein the localization components comprise:
   a plurality of data stores storing data localized to one or more distinct markets.

5. The localization platform of claim 1 wherein the localization components comprise:
   at least one machine translation system that provides a certain kind of localized data for selection by the translation matching component, the certain kind being automatically generated translation of data from a first spoken language into a different second spoken language.

6. The localization platform of claim 1, wherein the feedback comprises an indication of a plurality of different classes of resources which are contained in the plurality of localization components and include data that have already been localized.

7. A computer-implemented system comprising:
   a processor associated with the computer;
   an application having one or more resources to be localized; and
   a localization platform implemented using the processor, the localization platform comprising:
      a resource manager that is configured to receive input data corresponding to the one or more resources to be localized;
      a plurality of localization components providing localized data that is localized to one or more distinct markets;
      an ontology store storing ontology information; and
      a translation matching component that receives a localization request and the input data from the resource manager corresponding to the one or more resources to be localized, wherein the translation matching component accesses the plurality of localization components and the ontology store to disambiguate the input data associated with the application to be localized based on the localization request, and wherein the translation matching component selects and outputs localized data for the one or more resources from one or more of the plurality of localization components; and
      wherein the localization components provide confidence scores associated with localized data, given the input data and the translation matching component selects the localized data based on the confidence scores, the selection involving an evaluation of a relative magnitude of a first confidence score associated with a first item of localized data as compared to a second confidence score associated with a second item of localized data, wherein the first and second items of localized data are obtained from different components of the plurality of localization components, and wherein the first and second confidence scores comprise different measures of confidence that are correlated to one another.

8. The computer-implemented system of claim 7, wherein the system further comprises a second application that is different than the application, the second application having one or more resources to be localized, and wherein the translation matching component receives, from the resource manager, second input data corresponding to the one or more resources associated with the second application and accesses the plurality of localization components and the ontology store to disambiguate the second input data, and wherein the translation matching component selects and outputs second localized data for the one or more resources of the second application from one or more of the plurality of localization components.

9. The computer-implemented system of claim 8, wherein previously localized data for the one or more resources of the application is utilized by the translation matching component during localization of the one or more resources of the second application.

10. A computer-implemented method of localizing data, the method comprising:

receiving a localization request and input data from an authoring component utilized by an application developer to develop a plurality of resources associated with an application, the input data comprising the plurality of resources associated with the application;

accessing a plurality of localization components that provide localized data that is localized to one or more distinct markets, wherein the plurality of localization components comprise a plurality of reusable localization components having localized data that is reusable across multiple applications;

accessing an ontology store storing ontology information to disambiguate data associated with a particular resource to be localized based on the localization request;

selecting localized data, using a processor of the computer, from one or more of the plurality of localization components based on predetermined criteria and the disambiguated data; and providing feedback to the application developer that includes an indication of a recycle rate of the plurality of resources, the recycle rate being indicative of information in the plurality of reusable localization components from previous localization operations for other applications.

11. The method of claim 10, wherein the localization components provide confidence scores associated with localized data given the input data, and wherein a translation matching component is configured to select the localized data based on the confidence scores, the selection involving an evaluation of a relative magnitude of a confidence score associated with a first item of localized data as compared to a confidence score associated with a second item of localized data.

12. The method of claim 10, wherein the localization components comprise a plurality of data stores storing data localized to one or more distinct markets.

13. The method of claim 10, wherein the localization components comprise at least one machine translation system that provides a certain kind of localized data for selection by the translation matching component, the certain kind being automatically generated translation of data from a first spoken language into a different second spoken language.

14. The method of claim 10, wherein the feedback comprises an indication of a plurality of different classes of resources which are contained in the plurality of localization components and include data that have already been localized.

* * * * *